Aug. 8, 1950

M. S. SISULAK 2,518,389

SIDE DELIVERY RAKE

Filed Nov. 19, 1947

Inventor
Michael S. Sisulak
By Paul O. Pippel
Atty.

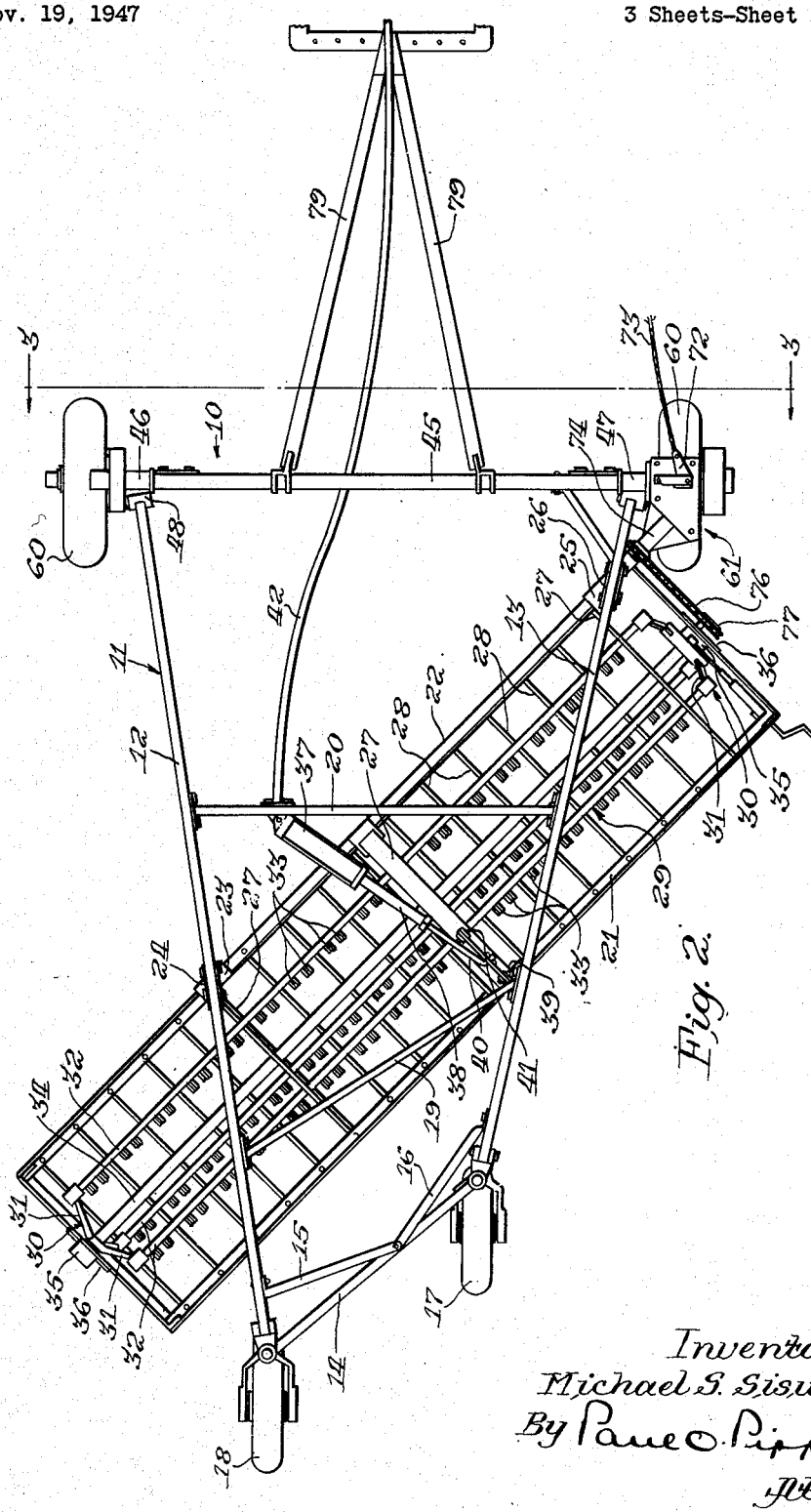

Aug. 8, 1950   M. S. SISULAK   2,518,389
SIDE DELIVERY RAKE
Filed Nov. 19, 1947   3 Sheets-Sheet 3

Inventor
Michael S. Sisulak
By Paul O. Pippel
Atty.

Patented Aug. 8, 1950

2,518,389

UNITED STATES PATENT OFFICE 2,518,389

SIDE-DELIVERY RAKE

Michael S. Sisulak, Chicago, Ill., assignor to International Harvester Company, a corporation of New Jersey Application November 19, 1947, Serial No. 786,984

7 Claims. (Cl. 56—377)

This invention relates to an improved side delivery rake, and more particularly to a side delivery rake of the tractor-drawn type. More specifically, it relates to a four-wheel tractor-drawn side delivery rake having a new and improved dependent axle construction for supporting a positive and efficient rake cylinder driving mechanism.

A prime object of this invention is to provide a rigid front axle construction for a side delivery rake, said construction being sufficiently strong to operate under heavy duty conditions.

Another object is to provide a novel and improved compact driving arrangement for rotating the rake cylinder of a heavy duty side delivery rake, said arrangement including driving mechanism operated by the front ground wheels.

Still another object is to provide an improved side delivery rake having a novel axle construction wherein the axles depend downwardly from the frame structure of the rake, thereby facilitating the use of standard size automobile wheels and tires which are entirely positioned beneath the frame structure, said wheels and tires being operable with an efficient and positive driving arrangement for driving the rake cylinder.

A further object is to provide an improved dependent axle construction for a side delivery rake, said construction including a novel driving arrangement for driving the rake cylinder from the front wheels of the rake.

These and other objects will become more clearly apparent from a reading of the following description when examined in conjunction with the accompanying drawings.

In the drawings:

Fig. 2 is a plan view of the same.

Figure 1:
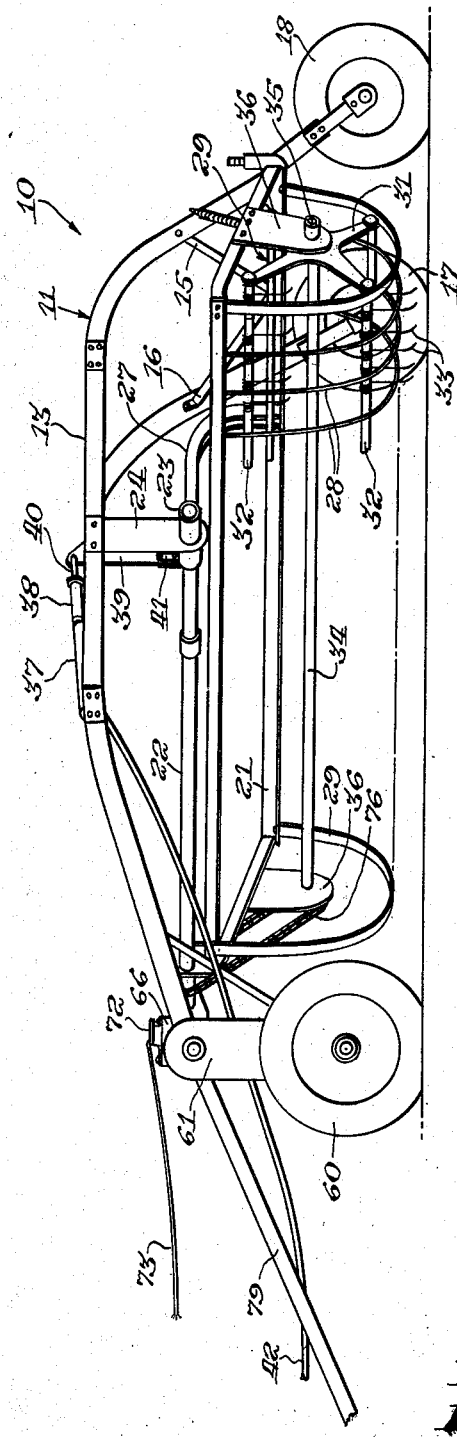
Fig. 1 is a side elevational view of a novel and improved side delivery rake.

Referring particularly to Figs. 1 and 2, a side delivery rake is generally indicated by the reference character 10. The rake 10 comprises a frame structure 11 including a pair of rearwardly extending laterally spaced longitudinal frame members 12 and 13. The frame members converge rearwardly and are connected at their rear ends by means of an angular brace 14. Stabilizing braces 15 and 16 further support the rear ends of the frame members 12 and 13 as best shown in Fig. 2. The frame structure 11 is supported at its rear by ground wheels 17 and 18 which may be of the castering type and are thereby free to pivot about a vertical axis. Cross braces 19 and 20 are further provided to stabilize the frame structure 11.

The frame structure 11 supports for pivotal movement a rake cylinder supporting frame 21. The frame 21, as best shown in Figs. 1 and 2, is of rectangular construction and may consist of a plurality of angle frame members. Connected to the forward portion of the supporting frame 21 is a torque tube 22. The torque tube 22 is pivotally mounted for rotation about a horizontal axis. One end of the torque tube 22 is journaled in a bearing member 23 supported by straps 24 which in turn are securely fastened to the frame member 12. The other end of the torque tube 22 is journaled in a bearing member 25 supported by straps 26 rigidly connected to the frame member 13. Supporting members 27, as best shown in Fig. 2, extend rearwardly from the torque tube 22 and are rigidly secured to the rearmost member of the supporting frame 21. A plurality of conventional type stripper rods 28 are securely fastened along the supporting frame 21.

The supporting frame 21 supports a rake cylinder 29. The rake cylinder 29 includes a pair of laterally spaced spiders 30 having spider arms 31. The spider arms 31 are each connected by an angularly extending tubular rod or carrying bar which support a plurality of rake teeth 33 in a conventional manner. The spiders 30 are rigidly secured to a rotatable shaft 34 extending the length of the frame 21. The shaft 34 is supported for rotation at each end of the frame 21 by means of bearing members 35. The bearing members 35 are suitably carried by depending bracket members 36.

The rake cylinder supporting frame 21 is adjustable vertically by means of a hydraulic cylinder 37. The hydraulic cylinder 37 includes piston arm 38 which is pivotally secured to a triangular crank arm 39. One end of the cylinder 37 is secured to the cross brace 20. As best shown in Fig. 2 the triangular crank arm 39 is rigidly connected at 40 to the cross brace 19. The triangular crank arm 39 has its lower end pivotally connected, as shown at 41, to one of the supporting members 27. A flexible conduit 42 is in communication with the cylinder 37, said conduit extending to a power unit mounted on a tractor (not shown). Movement and adjustment of the piston arm 38 serves to rotate the crank arm 39, thereby raising and lowering the rake cylinder frame 21 to the height desired by the operator.

The forwardmost portion of the frame structure 11 is provided with a transversely extending frame member 45. This frame member is preferably of tubular shape and may be constructed by welding two channel sections together or by providing a rectangular or cylindrical tube. The ends of the tubular frame member 45 are rigidly secured, by welding or other fastening means, to castings 46 and 47. The castings 46 and 47 include rearwardly projecting connecting members 48 and 49 which are rigidly secured to the respective frame members 12 and 13. The castings 46 and 47 are also provided with downwardly projecting connecting bosses 50 and 51 which engage, in telescoping relation, a pair of depending axle supports 52 and 53. The axle supports 52 and 53 are respectively constructed of square tubing or of channel sections securely welded together. The depending axle supports 52 and 53 are further rigidly secured by means of gusset plates 54, 55, and 56 which are rigidly secured to the frame structure. The lower ends of the axle supports 52 and 53 have connected thereto axle brackets 57 and 58 supporting axle members 59.

A rake cylinder drive mechanism is generally designated by the reference character 61. One of the drive mechanism 61 is provided for each wheel 60. A sprocket 62 is securely connected to a hub portion 62' of each wheel 60 and is arranged to rotate therewith. The sprockets 62 drive a drive chain 63. Each drive chain 63 extends upwardly and is trained around sprocket 64. The sprockets 64 are rigidly secured to a transversely extending shaft 65 for rotating the same. The shaft 65 is carried within the transversely extending tubular member 45.

Figure 4:
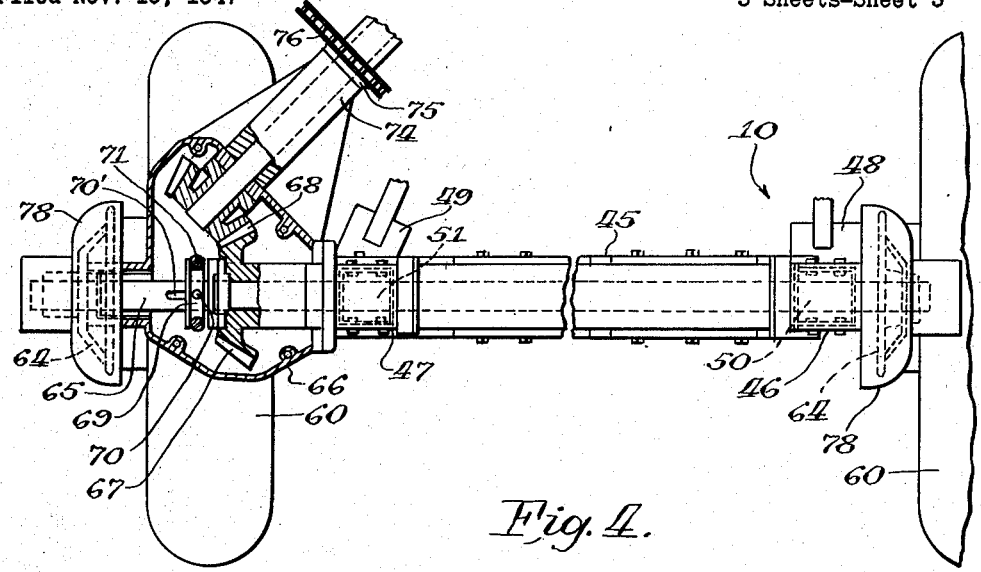
Fig. 4 is a plan view of the construction shown in Fig. 3.
Figure 3:
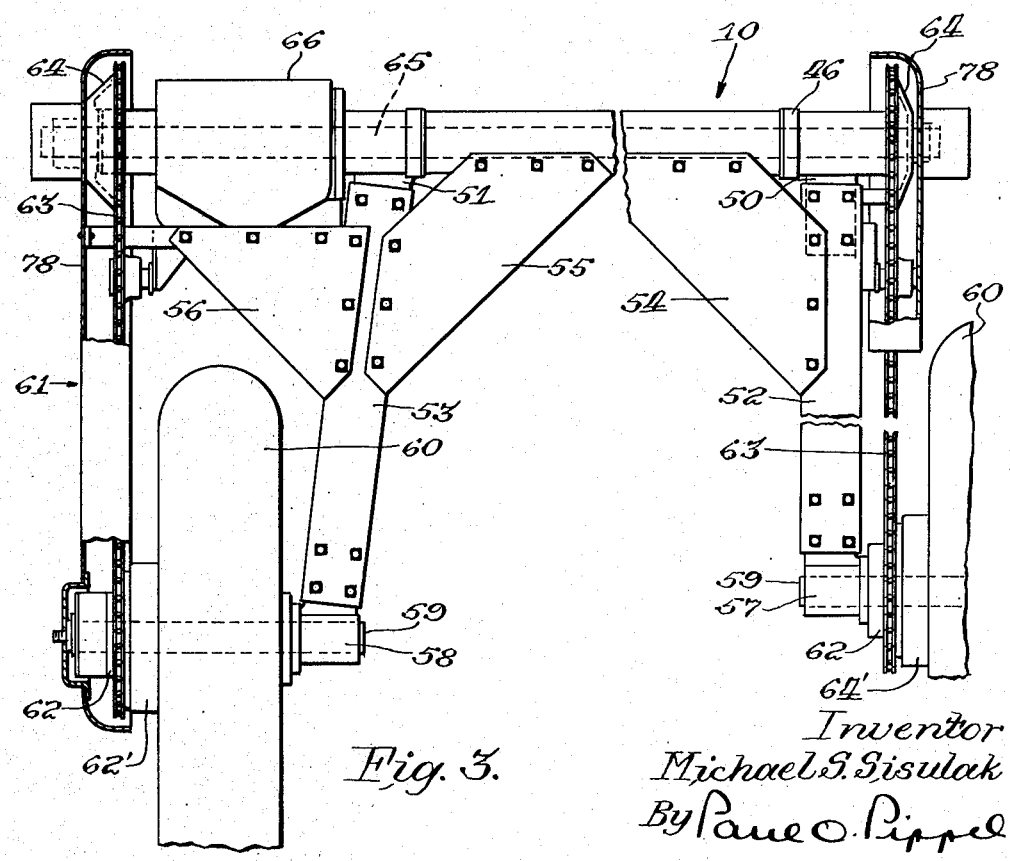
Fig. 3 is a front view of an improved axle construction for a side delivery rake, said view being taken along the line 3—3 of Fig. 2.

As best shown in Figs. 3 and 4, the shaft 45 extends through a transmission housing 66 having therein bevel gears 67 and 68 in driving engagement with one another. The bevel gear 67 is loosely journaled on the shaft 65 and is arranged to be connected in driving engagement with said shaft by means of a clutch member 69. The clutch member 69 is secured for rotation with the shaft by means of a pin 70 extending through a slot 70' in the shaft 45. A shifter fork 71 is arranged to shift said clutch member into driving engagement with the bevel gear 67. As best shown in Fig. 2, a crank arm 72 is provided. The crank arm 72 is arranged to move the shifter fork 71 in a conventional manner. A pull cord 73 leading to a tractor (not shown) is connected to the crank arm 72.

The sprocket 68 drives a triangular extending stub shaft 74 journaled on the bearing member 25 and the transmission housing 66. The stub shaft 74 has mounted for rotation therewith a sprocket 75 which is arranged to drive a chain 76 which in turn is connected to a sprocket 77. The sprocket 77 is rigidly secured to the shaft 34 of the rake cylinder 29. Rotation of the ground wheel 60 therefore effects rotating movement of the shaft 65, which in turn is transmitted through the transmission 66 to the rake cylinder for rotating the same.

A pair of chain guards 78 as best shown in Figs. 3 and 4 protect the drive mechanisms 61. A pair of draft members 79 are connected to the transversely extending tubular member 45 and are in turn connected in a conventional manner to the tractor draw bar of a tractor.

It can now be seen that an effective drive mechanism for the rake cylinder has been described. The drive mechanism is simple in construction and yet is durable and positive and can withstand the extreme usage to which the side delivery rake may be put during heavy duty working conditions. The depending axle construction is rigid and is inexpensive to manufacture. In view of the substantial length of the depending axle supports, a conventional size automobile wheel and tire may be utilized on the side delivery rake. The wheels may be spaced inwardly and underneath the side delivery frame in such a manner that the maximum stresses encountered during working conditions are easily and readily absorbed in the axle structure, thereby assuring a construction which may be put to heavy and long usage without repairs.

It is to be understood that changes and modifications may be made which do not depart from the spirit of the invention as disclosed nor the scope thereof as defined in the appended claims.

What is claimed is:

1. In combination, a side delivery rake having a frame structure, a rotatable rake cylinder pivotally suspended from said frame structure, rear ground wheels supporting said frame structure, laterally spaced depending axle supports rigidly connected to the forward end of said frame structure, and forward ground wheels journaled on said axle supports, said supports extending downwardly in a substantially transverse vertical plane below said frame whereby said forward ground wheels are positioned completely below said frame structure.

2. In combination, a side delivery rake having an overhanging frame structure, rear ground wheels supporting one end of said frame structure, a rotatable rake cylinder pivotally suspended from said frame structure, a transversely extending frame member connected to the forward end of said frame structure, said frame member having end portions projecting laterally outwardly from said frame structure, downwardly extending laterally spaced axle supports, said supports extending substantially below said frame in a substantially transverse vertical plane, and front ground wheels rotatably connected to said axle supports, said ground wheels being positioned below and inwardly of said transversely extending frame member.

3. In combination, a side delivery rake having a frame structure including laterally spaced longitudinal frame members, rear ground wheels connected to said frame structure, a rotatable rake cylinder pivotally suspended from said frame structure, a transverse tubular member connecting the forward ends of said longitudinal frame members, said tubular member having laterally spaced depending axle supports extending substantially below said frame structure in a substantially transverse vertical plane, stub axles connected to said axle supports, forward ground wheels journaled on said axles, means for rotating said rake cylinder, including a shaft rotatably supported by said tubular member, drive means for rotating said shaft from said front ground wheels, said drive means including a chain, and transmission means connecting said rotating shaft and said rake cylinder for rotating the same.

4. In combination, a side delivery rake having a frame structure including laterally spaced longitudinal frame members, rear ground wheels connected to said frame structure, a rotatable rake cylinder pivotally suspended from said frame structure, a transverse tubular member connecting the forward ends of said longitudinal frame members, said tubular member having laterally spaced depending axle supports extending substantially below said frame structure in a substantially transverse vertical plane, stub axles connected to said axle supports, forward ground wheels journaled on said axles, means for rotating said rake cylinder, including a shaft rotatably journaled within said tubular member, drive means for rotating said shaft from said front ground wheels, said drive means including a chain, transmission mechanism connected to said drive means, and means operatively connecting said transmission mechanism and said rake cylinder for rotating the same.

5. In combination, a side delivery rake having a frame structure including laterally spaced longitudinally extending frame members, ground wheels connected to the rear of said frame structure, a rotatable rake cylinder pivotally suspended from said frame and disposed angularly relative to the line of draft, a tubular transversely extending frame member connecting the forward ends of said frame members, said tubular frame member having laterally spaced vertically depending axle supports, a stub axle connected to each support, said stub axles being in a vertical plane with said tubular member, forward ground wheels rotatably mounted on said stub axles, said wheels being positioned entirely below said tubular frame member, means for rotating said rake cylinder, including a shaft rotatably journaled within said tubular frame member, a driving mechanism connecting said forward ground wheels and said shaft for rotating the same, said driving mechanism including a chain power transmission mechanism carried by said tubular frame, said power transmission mechanism including gear drive mechanism arranged to be driven by said rotatable shaft, and drive means operatively connecting said transmission mechanism and said rotatable cylinder for rotating the same.

6. In combination, a side delivery rake having an arched frame structure including laterally spaced diverging frame members, ground wheels connected to the rear of said frame structure, a rotatable rake cylinder pivotally suspended from said frame and disposed angularly relative to the line of draft, a tubular transversely extending frame member connecting the forward ends of said diverging frame members, said tubular frame member having laterally spaced vertically depending axle supports, a stub axle connected to each support, said stub axles being in a vertical plane with said tubular member, forward ground wheels rotatably mounted on said stub axles, said wheels being positioned entirely below said tubular frame member, means for rotating said rake cylinder, including a shaft rotatably journaled within said tubular frame member, a driving mechanism connecting said forward ground wheels and said shaft for rotating the same, said driving mechanism including a chain power transmission mechanism carried by said tubular frame, said power transmission mechanism including gear drive mechanism arranged to be driven by said rotatable shaft, and drive means operatively connecting said transmission mechanism and said rotatable cylinder for rotating the same.

7. In combination, a side delivery rake having an arched frame structure including laterally spaced diverging frame members, ground wheels connected to the rear of said frame structure, a rotatable rake cylinder pivotally suspended from said frame and disposed angularly relative to the line of draft, a tubular transversely extending frame member connecting the forward ends of said diverging frame members, said tubular frame member having laterally spaced vertically depending axle supports extending substantially below said frame, a stub axle connected to the lower end of each support, said stub axles being in a vertical plane with said tubular member, forward ground wheels rotatably mounted on said stub axles, said wheels being positioned entirely below said tubular frame member, means for rotating said rake cylinder, including a shaft rotatably journaled within said tubular frame member, driving mechanism connecting said forward ground wheels and said shaft for rotating the same, said driving mechanism including a chain power transmission mechanism carried by said tubular frame, said power transmission mechanism including a gear drive mechanism arranged to be driven by said rotatable shaft, and drive means operatively connecting said transmission mechanism and said rotatable cylinder for rotating the same.

MICHAEL S. SISULAK.

REFERENCES CITED

The following references are of record in the file of this patent:

UNITED STATES PATENTS

| Number | Name | Date |
|---|---|---|
| 1,283,474 | Dain | Nov. 5, 1918 |
| 1,728,301 | Murphy | Sept. 17, 1929 |
| 1,815,252 | Grigsby | July 21, 1931 |
| 2,024,994 | Cost | Dec. 17, 1935 |
| 2,403,401 | Rietz | July 2, 1946 |